Jan. 15, 1929.
J. H. JONES ET AL
1,699,109
OUTLET VALVE FOR WASHING MACHINE CASINGS
Filed Nov. 1, 1926
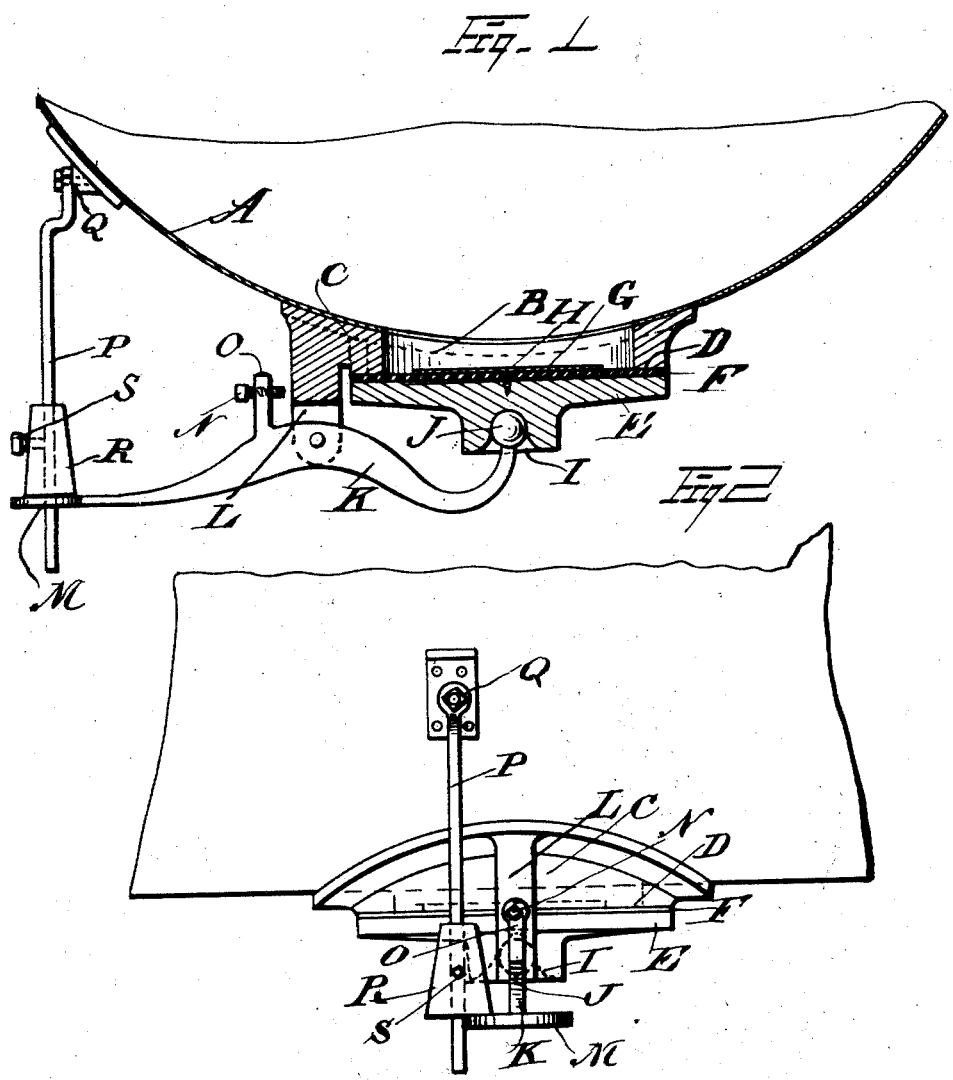

Patented Jan. 15, 1929.

1,699,109

UNITED STATES PATENT OFFICE.

JAMES H. JONES AND KENNETH C. JONES, OF CLEVELAND, OHIO.

OUTLET VALVE FOR WASHING-MACHINE CASINGS.

Application filed November 1, 1926. Serial No. 145,642.

The objects of the invention are to provide a simple form of valve for the outlet opening in the bottom of the cylinder of a washing machine, and simple and efficient means for operating the same to permit soiled water to be quickly removed from the cylinder.

The invention comprises a disc valve vertically movable over the outlet opening, and tiltable upon a ball joint which permits it to readily adapt itself to its seat, and also permits the rubber gasket therein to be easily accessible for substitution when worn out.

Adjustments are also provided for regulating the size of the outlet opening and for locking the valve operating parts when the valve is in the closed position, so that the jar of the machine will not loosen the valve.

The device also includes a form of construction that will avoid the use of rigid fastening devices, so that the valve can be tilted and repaired without the manipulation of nuts or bolts.

The invention is illustrated in the accompanying drawings, hereinafter more fully described, and specifically pointed out in the claims.

In the accompanying drawings, Fig. 1 is a vertical section of the device, Fig. 2 is a front elevation thereof.

In these views, A represents the cylinder of a washing machine; B is the outlet opening in the bottom thereof; C is metal sleeve encircling the same, which is provided with the horizontal valve seat, D; E is a disc-shaped valve provided with a resilient gasket, F, which is secured in place by means of the thin metal plate, G, and a central screw, H.

This valve is provided with a recess, I, in its lower face, in which a ball, J, upon the inner extremity of the operating lever, K, is inserted.

The valve is balanced upon this ball, and hence when closed will turn thereon to fit itself automatically to its seat.

The recess, I, is not enclosed, and the valve is held in place by its weight, and when it is desired to renew its surface or to replace a worn gasket, thereon, the end of the lever K is lowered and the valve disc can be tilted toward one side to give access to the fastening screw or the valve can be removed.

The lever K is pivoted in the bearing L at one side of the opening, and a pedal plate, M, at the outer end thereof permits it to be depressed by the foot.

A set screw, N, adjustable in a lug, O, on the lever controls the size of the outlet opening by limiting the amount of depression of the inner end of the lever and valve, as it falls away from its seat by gravity.

To lock the valve when in the closed position, a pendulum arm, P, pivoted at Q in the frame, is provided with an adjustable weight, R, which can be set to engage with the upper surface of the pedal M.

As shown in Fig. 2, a set screw, S, is employed to position the weight.

By means of this construction, the valve is made adjustable on its seat and is easily tilted or removed for repairs; and the construction requires no bolts or clamping parts that would require expert work or take up valuable time in their adjustment.

Having described the invention, what we claim as new and desire to secure by Letters Patent is—

1. In a gravity operating valve for the outlet opening of a washing machine, the combination with a sleeve encircling said opening and provided with a valve seat, a pedal operated lever, a bearing on said sleeve on which said lever is pivoted, the extremity of said lever being provided with a terminal ball, a disc valve for said opening, said valve being provided with a recess in its under face in which said ball is inserted, and a gasket and securing plate therefor on said valve.

2. In a gravity operating valve for the outlet opening of a washing machine, the combination with a sleeve encircling said opening and provided with a valve seat, a pedal operated lever, a bearing on said sleeve on which said lever is pivoted, the extremity of said lever being provided with a terminal ball, a disc valve for said opening, said valve being provided with a recess in its under face in which said ball is inserted, and a gasket and securing plate therefor on said valve, and means on said lever for regulating the amount of fall of said valve to control the size of said outlet opening.

3. In a gravity operating valve for the outlet opening of a washing machine, the combination with a sleeve encircling said opening and provided with a valve seat, a pedal operated lever, a bearing on said sleeve on which said lever is pivoted, the extremity of said lever being provided with a terminal ball, a disc valve for said opening, said valve being provided with a recess in its under face in which said ball is inserted, and a gasket and securing plate therefor on said valve, and automatically acting means for locking the valve in the closed position.

In testimony whereof we hereto affix our signatures.

JAMES H. JONES.
KENNETH C. JONES.